(12) United States Patent
Olson

(10) Patent No.: US 6,842,823 B1
(45) Date of Patent: Jan. 11, 2005

(54) METHODS AND APPARATUS FOR PERSISTENT VOLATILE COMPUTER MEMORY

(75) Inventor: Thomas M. Olson, Westborough, MA (US)

(73) Assignee: Stratus Technologies Bermuda LTD, Hamilton (BM)

(*) Notice: Subject to any disclaimer, the term of this patent is extended or adjusted under 35 U.S.C. 154(b) by 0 days.

(21) Appl. No.: 09/550,108

(22) Filed: Apr. 14, 2000

(51) Int. Cl.⁷ .............................................. G06F 12/06
(52) U.S. Cl. ........................ 711/129; 711/173; 713/1
(58) Field of Search ................................ 711/154, 170, 711/172, 173, 163, 129, 152; 713/1, 2, 100, 3

(56) References Cited

U.S. PATENT DOCUMENTS

| | | | |
|---|---|---|---|
| 5,155,844 A | 10/1992 | Cheng et al. ............... 395/575 |
| 5,255,367 A | 10/1993 | Bruckert et al. ............ 395/200 |
| 5,317,752 A | 5/1994 | Jewett et al. ............... 395/750 |
| 5,333,303 A | 7/1994 | Mohan ........................ 395/575 |
| 5,359,713 A | 10/1994 | Moran et al. ............... 395/200 |
| 5,383,161 A * | 1/1995 | Sanemitsu ............. 365/230.06 |
| 5,586,291 A | 12/1996 | Lasker et al. ............... 395/440 |
| 5,694,583 A | 12/1997 | Williams et al. .............. 703/24 |
| 5,720,027 A | 2/1998 | Sarkozy et al. ........ 395/182.04 |
| 5,794,252 A | 8/1998 | Bailey et al. ............... 707/202 |
| 5,799,324 A * | 8/1998 | McNutt et al. ............. 707/206 |
| 5,819,109 A | 10/1998 | Davis ........................ 395/835 |
| 5,875,465 A * | 2/1999 | Kilpatrick et al. .......... 711/134 |
| 5,898,869 A * | 4/1999 | Anderson ....................... 713/2 |
| 6,119,244 A | 9/2000 | Schoenthal et al. ............ 714/4 |
| 6,181,614 B1 | 1/2001 | Aipperspach et al. ....... 365/200 |
| 6,397,293 B2 | 5/2002 | Shrader et al. ............. 711/114 |
| 6,434,695 B1 * | 8/2002 | Esfahani et al. ............... 713/2 |
| 6,496,942 B1 | 12/2002 | Schoenthal et al. ........... 714/4 |
| 6,507,906 B1 * | 1/2003 | Criddle et al. ................ 713/2 |
| 6,636,963 B1 * | 10/2003 | Stein et al. .................... 713/1 |
| 2002/0124040 A1 * | 9/2002 | Foster et al. ................ 709/100 |

FOREIGN PATENT DOCUMENTS

| | | | | |
|---|---|---|---|---|
| EP | 0 461924 A2 * | 12/1991 | .......... G06F/12/08 |
| EP | 0 483978 A2 * | 5/1992 | ........... G06F/7/12 |
| EP | 0 488366 A3 | 6/1992 | .......... G11C/16/06 |
| EP | 0 488 366 A2 | 6/1992 | .......... G11C/16/06 |
| EP | 0 642079 A1 | 3/1995 | .......... G06F/11/14 |
| EP | 0 772136 A3 | 5/1997 | .......... G06F/17/00 |
| EP | 0 772136 A2 | 5/1997 | .......... G06F/17/00 |
| WO | WO 95/12848 A1 | 5/1995 | |
| WO | 95/12848 | 5/1995 | .......... G06F/11/00 |

OTHER PUBLICATIONS

Annex to Form PCT/ISA/206 Communication Relating to the Results of the Partial International Search to International Application No.: PCT/US 01/12138 mailed on Nov. 27, 2000.

(List continued on next page.)

Primary Examiner—Pierre Bataille
(74) Attorney, Agent, or Firm—Lahive & Cockfield, LLP

(57) ABSTRACT

A method and apparatus for persistent volatile computer memory. In one embodiment, the memory of a computer in partitioned into two regions, one directly accessible to the operating system and one accessible to the operating system only through an intermediary program such as a device driver. In another embodiment, the partitioning of computer memory is achieved through modifications to the computer's BIOS, preventing the operating system from directly addressing a region of volatile computer memory and protecting the contents of the region from modification during a boot cycle.

23 Claims, 5 Drawing Sheets

OTHER PUBLICATIONS

Nørv g, K. "The vagabond temporal OID index: an index structure for OID indexing in temporal object database systems." *2000 International Database Engineering and Applications Symposium* pp. 158–1666 (2000).

Form PCT/ISA/210 Patent Cooperation Treaty International Search Report to International Application No.: PCT/US02/11485 mailed Jul. 21, 2003.

Chen et al., *"The Rio File Cache: Surviving Operating System Crashes"*; University of Michigan, Department of Electrical Engineering & Computer Science; pp. 1–11.

Form PCT/ISA/210, International Search Report for International Application No. PCT/US01/12138, mailed on Mar. 26, 2002.

* cited by examiner

METHODS AND APPARATUS FOR PERSISTENT VOLATILE COMPUTER MEMORY

FIELD OF THE INVENTION

The present invention relates to preserving the contents of computer memory and, in particular, to preserving the contents of a volatile memory during a system failure.

BACKGROUND OF THE INVENTION

Prior art computer systems typically include a volatile memory for the storage and manipulation of information by an operating system and various software applications. When software applications behave in unexpected ways, they can cause the operating system to fail in catastrophic ways, referred to colloquially as a "system crash." When a system crashes, there is no guarantee that the information stored in volatile memory can be salvaged. Typically, the user remedies the system crash by resetting the system. In the resulting boot cycle the operating system typically loses the ability to reference the information contained in the volatile memory or actually initializes the volatile memory, changing or destroying its contents.

Prior art solutions to this problem have taken various approaches. One approach requires a user manually to direct applications to save the contents of volatile memory to a non-volatile memory when significant amounts of information have been processed in volatile memory. An incremental improvement over this approach takes the form of modifications to the software applications themselves, whereupon they save the contents of volatile memory to a non-volatile memory when certain criteria are met. For example, the word processing program Microsoft Word™ from Microsoft Corporation, Redmond, Wash. has an option that automatically saves the contents of documents upon the elapse of a time period selected by the user.

These prior art systems have several failings. First, a failure in the operating system may prevent the functioning of any application-level safeguards. Second, safeguards that rely on regular human intervention are subject to human failings, such as when humans forget to invoke them. Third, safeguards that attempt to substitute application-administered criteria for human judgment and invocation fail in that they cannot guarantee that critical information would be saved when a human user would have chosen to save it.

A second set of prior art solutions to this problem has focused on hardware modifications to preserve the contents of volatile memory during a crash. Some prior art systems are arranged such that every read or write request to an operating system is simultaneously routed to a non-volatile memory. Such a system guarantees a record of memory contents that can be reconstructed during a boot cycle, but suffers from slowness during normal operation, because each transaction is conducted twice, and slowness during a boot cycle, because the operating system must locate the non-volatile record of transactions and reload them. Other prior art systems attempt the same techniques and suffer from the same problems, but reduce the magnitude of the delays by greater selectivity in the transactions actually recorded, or recording transactions in a way that is more amenable to reconstruction. Other prior art systems relying on hardware modification use non-volatile memories, such as electrically erasable programmable read-only memories (EEPROMs), Flash ROM, or battery-backed random-access memory. These systems have several drawbacks, including higher prices than normal volatile memories and the requirement of additional hardware. For example, Flash ROM often requires a charge pump to achieve the higher voltages needed to write to the memory, and suffers a shorter life than normal volatile RAM because of this process. Battery-backed RAMs rely on batteries that are subject to catastrophic failure or charge depletion.

A computer whose information is stored in a volatile memory resistant to loss or corruption resulting from system or application crashes would avoid the problems associated with the loss and recreation of data. The elimination of time-consuming data reconstruction would help make possible a fault-tolerant computer that offered continuous availability. The present invention provides those benefits.

SUMMARY OF THE INVENTION

The present invention relates to methods and apparatus for providing a persistent volatile computer memory. One object of the invention is to provide at least one region of volatile memory whose contents are resistant to loss or corruption from system or application crashes and the ensuing reboot cycle. Another object of the invention is to guarantee that the contents of these regions of persistent volatile computer memory do not include the results of incomplete or partial transactions.

In one embodiment, one feature of the invention is the partitioning of computer memory into two types of regions: a non-persistent region directly accessible to the operating system and a persistent region that is not directly accessible to the operating system. Another feature of the invention is an intermediary program, such as a device driver, that serves as an intermediary between the operating system and the persistent memory region, processing requests from the operating system directed to the persistent region of memory. Yet another feature of the invention is that the contents of the persistent memory region are resistant to initialization or modification during a boot cycle. Another feature of the invention is that the intermediary program processes write requests atomically, preventing the results of incomplete or partial transactions from subsequent loading from the persistent memory region by computer applications.

In another embodiment, one feature of the invention is a modified BIOS, wherein the modification effectively partitions the memory into two types of regions: a non-persistent region directly accessible to the operating system and a persistent region that is not directly accessible to the operating system. Another feature of the invention is a intermediary program, such as a device driver, that processes read requests and write requests from the operating system to this persistent memory region. Yet another feature of the invention is that the contents of the persistent memory region are resistant to initialization or modification during a boot cycle.

In yet another embodiment, one feature of the invention is the partitioning of computer memory into two types of regions: non-persistent region directly accessible to the operating system and persistent region that is not directly accessible to the operating system. Another feature of the invention is a program that maps the persistent region onto physical memory locations, enabling the operating system to indirectly access the persistent region.

BRIEF DESCRIPTION OF THE DRAWINGS

These and other advantages of the invention may be more clearly understood with reference to the specification and the drawings, in which.

In the drawings, like reference characters generally refer to the same parts throughout the different views. Also, the drawings are not necessarily to scale, emphasis instead being placed upon illustrating the principles of the invention.

DETAILED DESCRIPTION OF THE INVENTION

Figure 1:
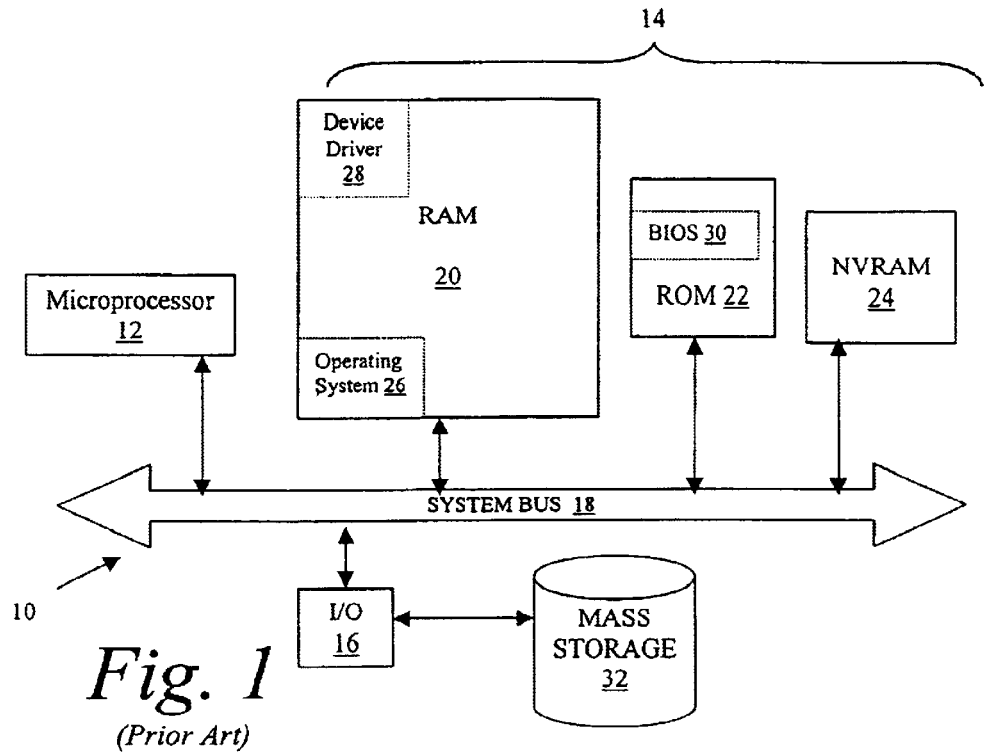
FIG. 1 is a block diagram of an embodiment of a computer known to the prior art.

Referring to FIG. 1, a computer 10 known to the prior art typically includes a microprocessor 12, a memory 14 for storing programs and/or data, an input/output (I/O) controller 16, and a system bus 18 allowing communication among these components. The memory 14 in such a computer typically includes random-access memory (RAM) 20, read-only memory (ROM) 22, and non-volatile random-access memory (NVRAM) 24. The RAM 20 typically contains an operating system 26 and one or more device drivers 28 that permit access to various peripherals by the operating system 26. The ROM 22 typically contains a basic input-output system (BIOS) 30 that handles the boot process of the computer 100. One or more input devices, such as an alphanumeric keyboard or a mouse, and one or more output devices, such as a display or a printer, are also typically included in the computer 10. In some embodiments the computer 10 will also include a network connection. The computer 10 typically has a mass storage device 32 such as a magnetic disk or magneto-optical drive.

In brief overview, applicant's invention provides a persistent volatile memory in a computer while avoiding the failings of the prior art. This is achieved by partitioning the volatile computer memory into two regions: a non-persistent memory region that is directly accessible to the operating system and typically is initialized or modified during a boot cycle, and a persistent memory region whose contents are not initialized or modified during a boot cycle. In one embodiment, the operating system can indirectly access this persistent memory region through an intermediary program such as a device driver. In another embodiment, the intermediary program invokes operating-system level functionality to enable the operating system to access this persistent memory region only after the boot cycle is completed. This invention is particularly useful in a system-critical fault-tolerant computer that offers continuous availability. Of course, it is to be understood that the invention may include multiple persistent and non-persistent memory regions. For simplicity of explanation and depiction, the following discussion assumes two memory regions, one persistent and one non-persistent. Further, the invention would work equivalently if two independent memory units were used instead of two regions of one memory. Thus, when memory regions are discussed, equivalent descriptions apply for two independent memory units.

Figure 2:
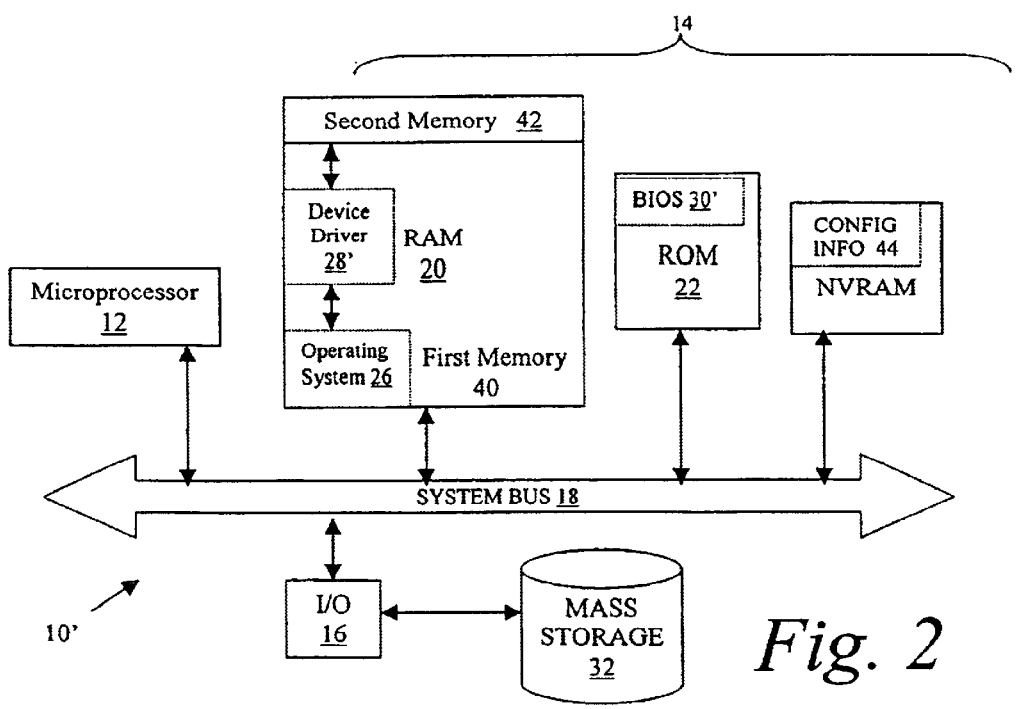
FIG. 2 is a block diagram of an embodiment of a computer constructed in accordance with the present invention.
Figure 3:
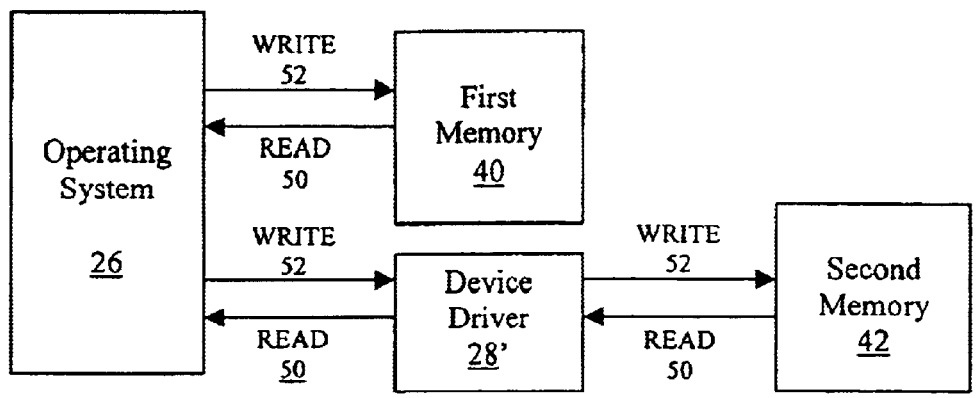
FIG. 3 is a functional block diagram of the embodiment of the present invention depicted in FIG. 2.

One embodiment of the present invention is shown in FIGS. 2 & 3. In the embodiment shown, the system includes a computer 10' with RAM 20 partitioned into two different regions. The first memory region 40 is directly accessible to the operating system and is typically initialized or modified during a boot cycle. A device driver 28' handles read requests 50 and write requests 52 from the operating system 26 directed to the second memory region 42. One skilled in the art would recognize that a device driver can be replaced by other intermediary programs that provide the same functionality. A modified BIOS 30' prevents the operating system 26 from directly accessing the contents of the second memory region 42. The second memory region 42 is not directly accessible to the operating system 26 and therefore is not modified or initialized during a boot cycle. In one embodiment of the present invention, configuration information 44 regarding the location and size of the second memory region 42 is stored in an entry in NVRAM 24.

Referring again to FIG. 1, during a normal boot operation a computer 10 typically invokes a BIOS 30 that typically provides low-level access to peripherals; identifies RAM 20 available to the processor 12; initializes this RAM 20, typically destroying its contents; and then installs the operating system 26 into RAM 20, giving the operating system access to the entire RAM 20 to move information into and out of memory as necessary. If the computer 10 is started after having been powered down, all of its memory will have been initialized.

In contrast, referring to FIG. 2, during a normal boot operation a computer 10' constructed in accordance with the present invention invokes a modified BIOS 30'. The modified BIOS 30' retrieves configuration information 44 from NVRAM 24. This configuration information 44 includes the start address and the size of persistent memory. If both these values are zero or non-existent, then the modified BIOS 30' knows that the invention is either not installed or disabled. If the size is non-zero, but the start address is zero, then the start address is recalculated by subtracting the size of the persistent memory from the total memory size and storing this result as the new start address.

The modified BIOS 30' then divides the RAM 20 into two memory regions: a first non-persistent memory region 40 ranging from address 0 up to, but not including, the persistent memory start address, and a second persistent memory region 42 consisting of all memory from the persistent memory start address up to, but not including, the sum of the persistent memory start address and the persistent memory size. The system then initializes the first memory region 40. The modified BIOS 30' still provides low-level access to peripherals, but installs the operating system 26 into the first memory region 40 of RAM 20, and preventing the operating system 26 from directly accessing the second memory region 42 during the boot cycle and normal computer operation. The operating system 26 is, in effect, unaware of the second memory region 42. The operating system 26 typically initializes or installs its own programs into the first memory region 40, often modifying the contents of the first memory region 40, but does not modify the contents of the second memory region 42 of which it is unaware. This renders the contents of the second memory region 42 persistent through a boot cycle.

Typically the operating system 26 will load device drivers 28 to permit access to various peripheral devices. Referring again to FIG. 3, in one embodiment of the present invention the operating system 26 loads a device driver 28' that is aware of the second memory region 42 and is able to access its contents. The device driver 28' is aware of the second memory region 42 because it is also aware of and accesses the configuration information 44 stored in NVRAM 24. After loading the configuration information 44, the device driver 28' serves as an intermediary between the operating system 26 and the second memory region 42. The device driver 28' takes a read request 50 from the operating system 26 and returns information from the appropriate location in the second memory region 42. Similarly, the device driver 28' takes a write request 52 from the operating system 26 and stores information at the appropriate location in the second memory region 42. In another embodiment, an intermediary program installs and configures the invention, and then invokes operating-system level functionality to enable the operating system to access this second set of memory regions only after the boot cycle is completed.

For example, in one embodiment of the invention the operating system 26 is the Windows 2000 operating system. Under Windows 2000, the second memory region 42 accessible through the device driver 28 appears to the operating system 26 as a RAM disk, though the contents of a normal RAM disk do not survive a boot cycle, in contrast to the present invention. A Windows 2000 read request 50 or write request 52 includes a offset value (in bytes) and a length value (in bytes). The device driver 28' computes the appropriate location in the second memory region 42 by adding the offset value in the request to the start address of the persistent memory region. In one embodiment, the second memory region 42 includes 1 MB of configuration information, so the appropriate location is actually the sum of the offset value, the start address of the persistent memory, and 1 MB. For a read request 50, the device driver 28 copies a number of bytes equal in size to the length value from the computed location in the second memory region 42 to the user's buffer. For a write request 52, the device driver 28 copies a number of bytes equal in size to the length value passed by the operating system 26 from the user's buffer to the computed location in the second memory region 42. This interaction permits the operating system 26 to indirectly access the second memory region 42 without threatening the integrity of the contents of the second memory region 42 during a boot cycle. In another embodiment where Windows 2000 is the operating system 26, the device driver 28' invokes the functionality of the operating system 26 to map the computed location onto the virtual address space of the operating system 26 for the copy operation. Other operating system 26 functionality completes the copy operation and unmaps the computed location from the virtual address space of the operating system 26.

It is possible for the operating system 26 to crash while a write request 52 to persistent memory is being executed. In that case, an incomplete version of the request would be stored in the second persistent memory region 42. This can cause problems during subsequent operation, as a computer application may attempt to restore its state based on this incomplete information, potentially crashing the application and necessitating time-consuming reconstruction of the information lost during the crash.

Figure 4:
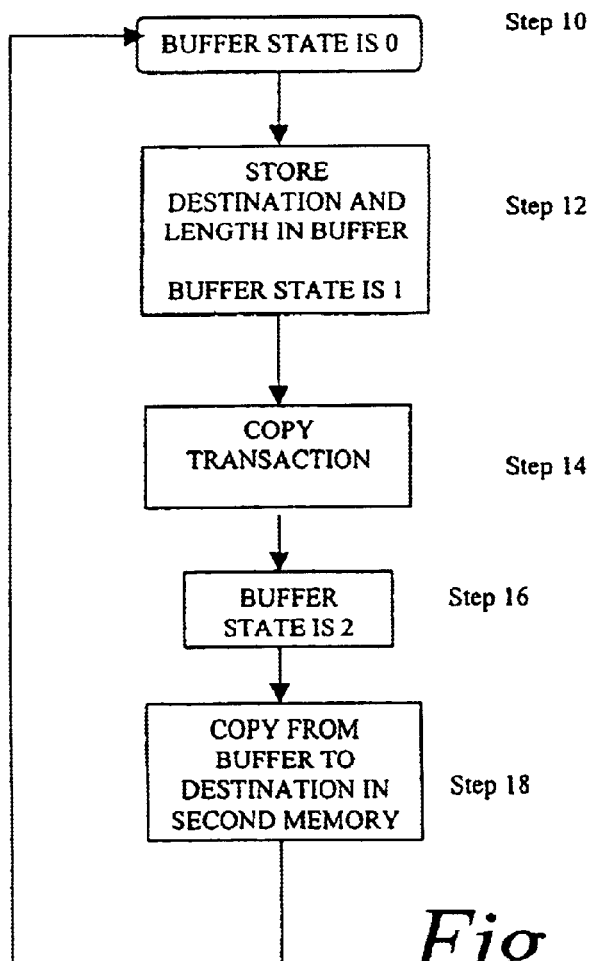
FIG. 4 is a flowchart depicting the state of a look-ahead buffer while processing a write request atomically in accord with the present invention.

To prevent this problem, the present invention creates a look-aside buffer in the second persistent memory region 42 and uses it for the atomic update and storage of transaction information; only when the write request 52 has been buffered and completed is it transferred out of the look-aside buffer. In greater detail, a look-aside buffer includes a set of bits that describe its state. FIG. 4 shows how the state of the look-aside buffer changes to reflect various stages in the processing of a write request 52.

When no information is in the buffer, for example at the creation and initialization of the buffer, the buffer state is 0 (Step 10). When a write request 52 is received by the device driver 28', the driver 28' stores the computed location and the length (in bytes) of the request in the look-aside buffer and the state of the buffer becomes 1 (Step 12). At this point, the actual contents of the write request are copied into the buffer (Step 14). If the copy is successfully completed, the buffer state becomes 2 (Step 16). If the copy fails because of, for example, a system crash, the buffer state remains at 1. Once the buffer state is set to 2, the contents of the write request are copied out of the look-aside buffer to their computed location in the second persistent memory region 42 (Step 18). When this is successfully completed, the buffer state returns to 0 (Step 10).

Figure 5:
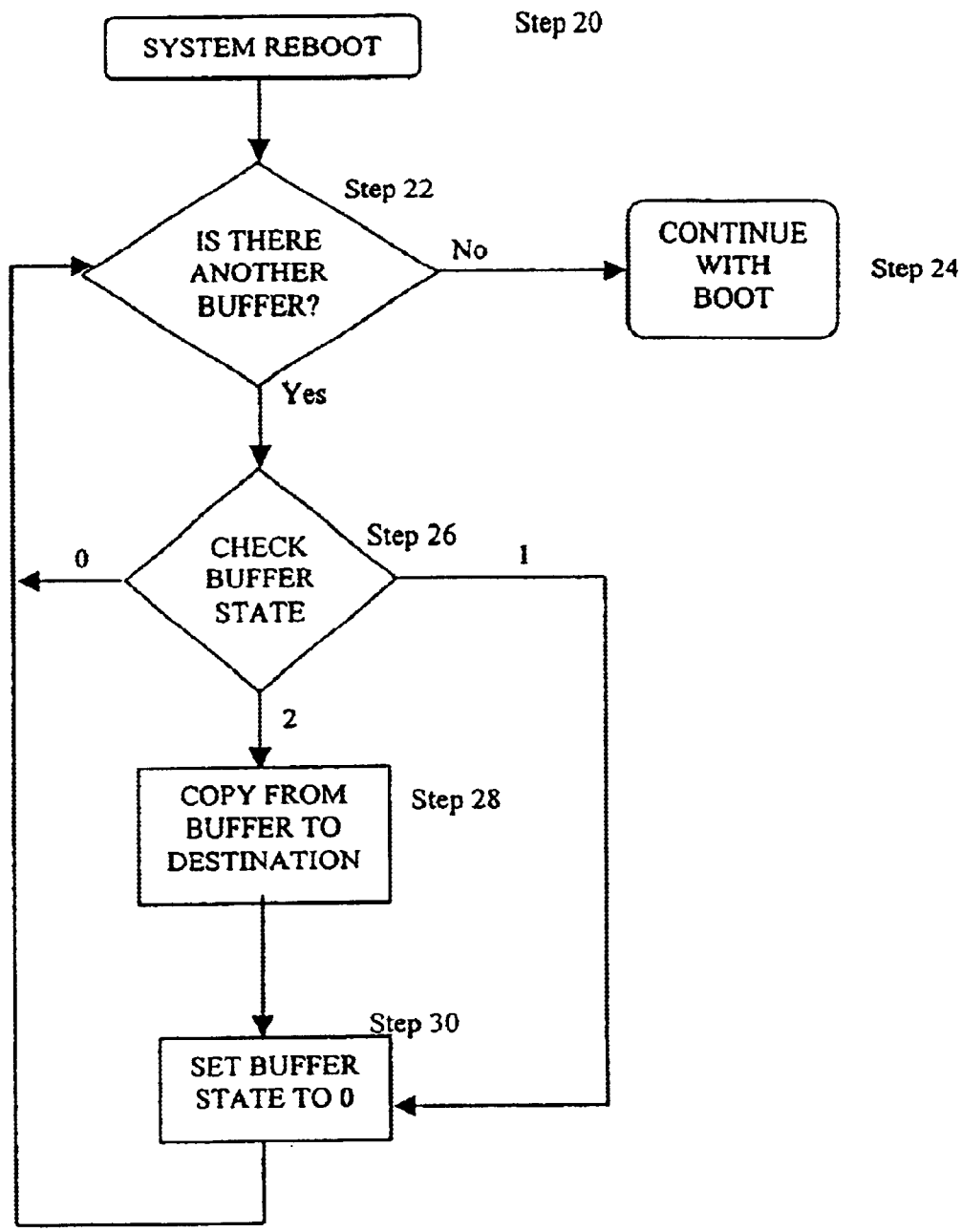
FIG. 5 is a flowchart depicting the recovery of completed transaction information during a boot cycle in accord with the present invention.

The effect of the value of the state of the look-aside buffer on the subsequent boot process is depicted in FIG. 5. At system reboot (Step 20), the device driver 28' locates all the look-aside buffers in the second persistent memory region 42. If there are no more look-aside buffers to check (Step 22), the system boot process continues (Step 24). If there are more look-aside buffers (Step 22), the device driver proceeds to examine the state of each look-aside buffer, one at a time, in the second persistent memory region 42 (Step 26). If the state of the buffer presently under examination is 0, the device driver 28' knows that there is no information stored in the look-aside buffer and the device driver 28' checks the next look-aside buffer (Step 22). If the buffer state is 1, the device driver 28' knows that the information in the look-aside buffer is the result of an incomplete transaction and should not be moved into the second persistent memory region 42 for recovery by a computer application. The device driver 28' sets the state of this buffer to 0 (Step 30) and checks the next look-aside buffer (Step 22). If the buffer under examination is in state 2, then the device driver 28' knows that the contents of the look-aside buffer are the result of a completed transaction that did not get copied into the second persistent memory region 42. The device driver 28' copies the contents of the look-aside buffer to the computed location in the second persistent memory region 42 (Step 28). When the copy is completed, the buffer state is set to 0 (Step 30) and the device driver 28' checks the next look-aside buffer (Step 22). Eventually the device driver 28' will have checked the state of all the look-aside buffers, and the system boot will continue (Step 24).

Figure 6:
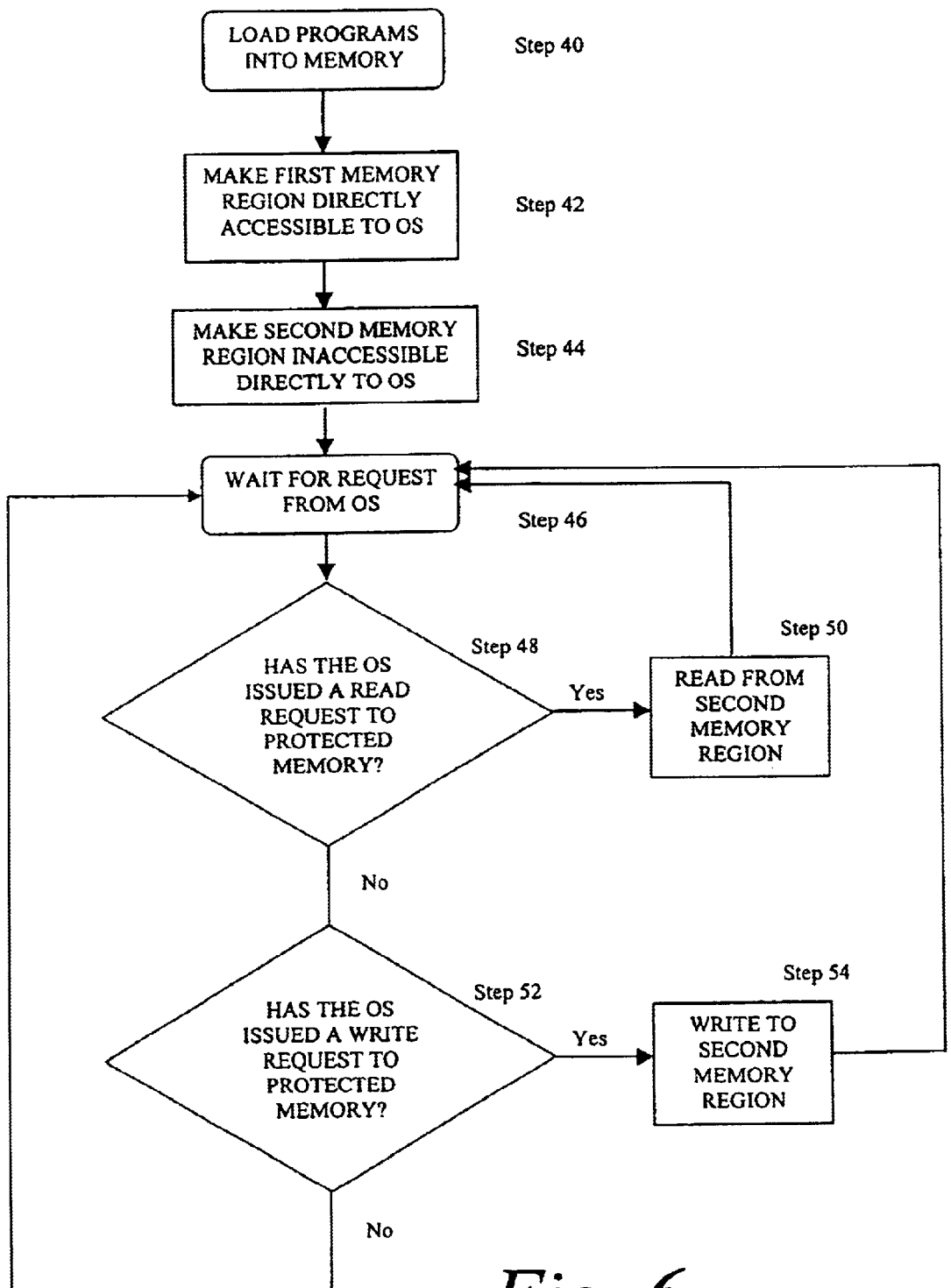
FIG. 6 is a flowchart depicting the operation of an embodiment of the present invention.

Referring to FIG. 6, during a boot cycle the computer loads the programs implementing the invention into memory at Step 40. In one embodiment, the programs are a modified BIOS and a device driver. The programs divide the memory into two portions: a first region directly accessible to the operating system in Step 42 and making a second region that is not directly accessible to the operating system in Step 44. This is accomplished through modifications to the BIOS. The inaccessibility to the operating system renders the contents of the second region resistant to initialization or modification during a boot cycle. Again, one skilled in the art will recognize that the present invention permits multiple persistent and non-persistent memory regions, but for the sake of simplicity of discussion and depiction, the present discussion assumes one persistent memory region and one non-persistent memory region.

Once the memory partitioning has been achieved, a device driver 28' or similar intermediary program provides indirect access to the second memory region 42 to the operating system. In step 46, the device driver 28' waits for a read request 50 or a write request 52 from the operating system 26. The device driver 28' decides (Step 48) whether a read request has been received, and if one has, then the intermediary program reads (Step 50) from the appropriate location in the second memory region 42 and returns the result to the operating system 26. Similarly, if the device driver 28 decides (Step 52) that a write request 52 has been received, then the device driver stores (Step 54) information at the appropriate location in the second memory region 42. If neither type of request has been received, then the device driver returns to step 36 and continues to wait for requests. Typically, read and write requests from the operating system to the first memory region operate as they would have before the installation of the present invention.

In the preferred embodiment, the computer programs comprising the present invention are on a magnetic disk drive and selecting an icon invokes the installation of the programs, initializing the present invention. In general, the programs implement the invention on the computer, and the programs either contain or access the data needed to implement all of the functionality of the invention on the computer.

Figure 7:
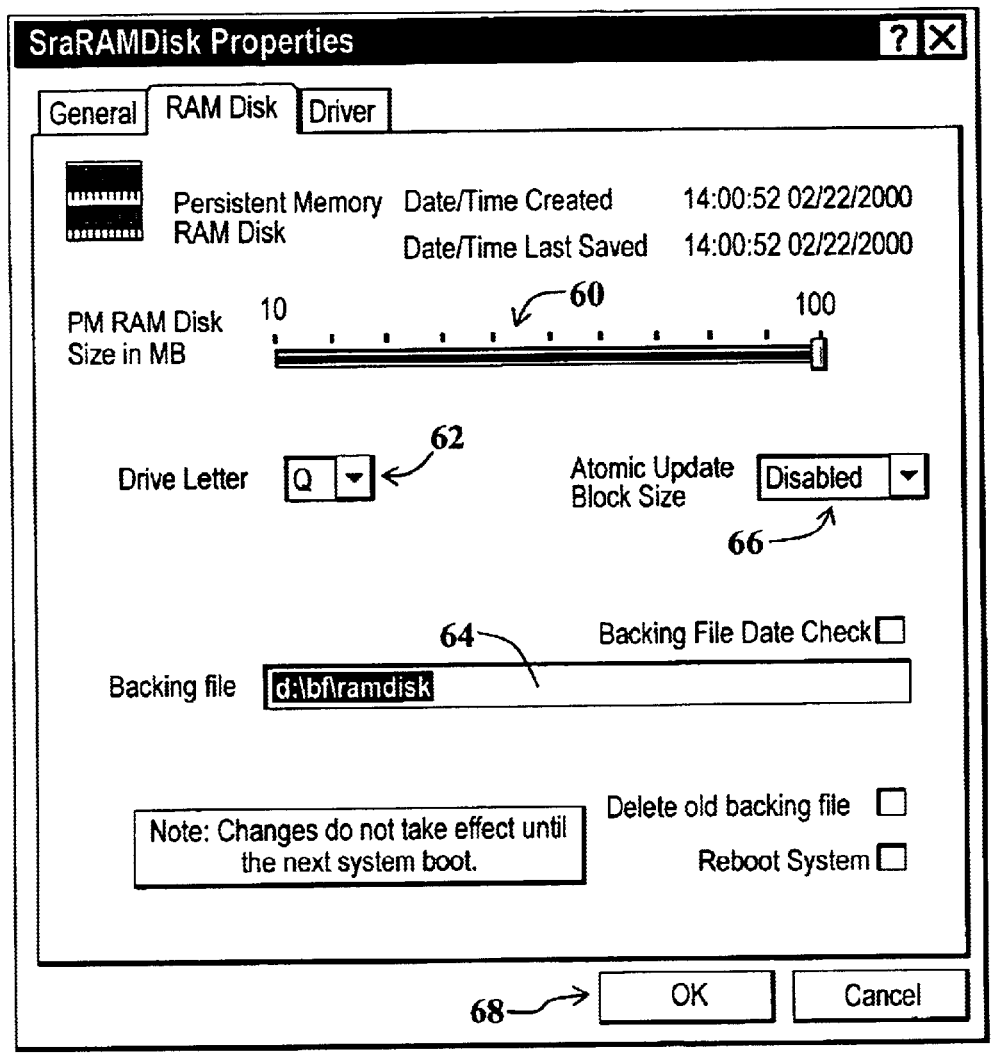
FIG. 7 is an embodiment of an interface presented to the user to solicit information for the configuration of the present invention.

Referring to FIG. 7, the user is prompted to configure the invention prior to its installation with a user interface. In one embodiment, this prompt takes the form of a dialog box, though other forms of prompting are feasible, typically including asking the user a series of questions or requiring the user to manually edit a configuration file. The dialog box typically permits the user to choose the size of the persistent memory and choose a designation through which the operating system accesses it. This configuration information provided by the user is stored in non-volatile storage, such as NVRAM 24 or as a file entry in a mass storage device 32. In a preferred embodiment, a dialog box includes a slider element 60, a pop-up menu element 62, and a text-entry element 64. The slider element 60 permits the user to select the size of the persistent memory. For example, the slider element 60 permits the user to select a persistent memory from 10 to 100 MB in size in 10 MB increments. Of course, particular numerical values may vary between implementations. The pop-up menu element 62 permits the user to assign a drive letter to the device driver 28' to permit the operating system to address it. The text-entry element 64 permits the user to designate a file name for the backing store file. A pop-up menu element 66 permits the user to designate the transaction size for the atomic update feature described above. When the user has entered the configuration information, the user selects the OK button 68 which initiates the embodiment of the present invention in the computer. The invention is installed and typically becomes effective after the next boot cycle. In one embodiment the present invention is implemented in RAM, but it may also be implemented in a storage-based virtual memory system or some other memory apparatus.

Many alterations and modifications may be made by those having ordinary skill in the art without departing from the spirit and scope of the invention. Therefore, it must be expressly understood that the illustrated embodiment has been shown only for the purposes of example and should not be taken as limiting the invention, which is defined by the following claims. The following claims are thus to be read as not only literally including what is set forth by the claims but also to include all equivalent elements for performing substantially the same function in substantially the same way to obtain substantially the same result, even though not identical in other respects to what is shown and described in the above illustration.

What is claimed is:

1. In a computer system comprising an operating system, an intermediary program, and a volatile memory, a method for providing a persistent region of the volatile memory, the method comprising the steps of:

(a) partitioning the volatile memory into a first, contiguous, non-persistent memory region and a second, contiguous, persistent memory region;

(b) providing an intermediary program in communication with the second, persistent memory region such that the second, persistent memory region is accessible to the operating system solely through the device driver.

2. The method of claim 1 wherein the contents of the second, persistent memory region are not initialized during a boot cycle.

3. The method of claim 1 wherein the second, persistent memory region comprises a look-aside buffer used by the intermediary program for atomic update and storage of write requests.

4. The method of claim 1 wherein step (a) comprises the steps of:

(a-a) reading a stored address defining the start address of the second, persistent memory region;

(a-b) reading a stored value defining the size of the second, persistent memory region; and (a-c) creating a second, persistent memory region at the start address equal in size to the stored value defining the size of the second, persistent memory region.

5. The method of claim 4 wherein the program reads the stored addresses and stored values defining the size of the second, persistent memory region from a non-volatile memory element.

6. An operating system memory environment comprising:

a first, contiguous memory mode region of volatile memory accessible to users and to the operating system;

a second, contiguous memory mode region of volatile memory accessible only to the operating system and not to users; and a third, contiguous memory mode region of volatile memory not accessible by users and not directly accessible by the operating system.

7. The operating system memory environment of claim 6 wherein the operating system is a Microsoft Windows operating system.

8. A computers operating under control of a memory-mapped operating system, the computer comprising:

a volatile memory including a first, contiguous non-persistent memory region that is mapped by the operating system; and a second, contiguous, persistent memory region that is not mapped by the operating system.

9. The computer of claim 8 further comprising:

a device driver in communication with the operating system and the second, persistent region of volatile memory, wherein the operating system addresses the second, persistent region of volatile memory using the device driver.

10. The computer of claim 9 wherein the second, persistent region of volatile memory comprises a look-aside buffer used by the device driver for atomic update and storage of write requests.

11. The computer of claim 8 wherein the locations of the second, persistent region of volatile memory are mapped by the operating system or a user application upon completion of the boot cycle.

12. A computer operating under control of an operating system, the computer comprising:
a volatile memory, including a first, contiguous, non-persistent memory region, the first non-persistent memory region directly accessible by the operating system, and initialized during a boot cycle, and a second contiguous persistent memory region not directly accessible by the operating system and not initialized during a boot cycle; and
an intermediary program in communication with the operating system and the second, persistent memory region;
wherein the intermediary program enables the operating system to address the second, persistent memory region.

13. The computer of claim 12 wherein the first, non-persistent memory region and the second, persistent memory region comprise different physical volatile memory elements.

14. The computer of claim 12 wherein the intermediary program is a device driver.

15. The computer of claim 12 additionally comprising:
a basic input/output system (BIOS) preventing direct access to the second, persistent memory region by the operating system.

16. The computer of claim 12 wherein the second, persistent memory region is allocated to redundant CPU memory locations.

17. The computer of claim 12 additionally comprising:
a non-volatile memory element storing information concerning the configuration of the second, persistent memory region.

18. The computer of claim 12 additionally comprising:
a non-volatile memory element storing information concerning the configuration of the first, non-persistent memory region.

19. The computer of claim 12 additionally comprising:
a file storing information concerning the configuration of the second, persistent memory region.

20. The computer of claim 12 additionally comprising:
a file storing information concerning the configuration of the first, non-persistent memory region.

21. The computer of claim 12 wherein the persistent memory region comprises:
a look-aside buffer, comprising:
a set of state bits, and
a buffer region for the storage of data, wherein the look-aside buffer is used for the atomic storage and update of write requests.

22. A storage medium having embodied thereon a program which, when loaded into a computer having an operating system and a volatile memory partitioned into a first, contiguous non-persistent memory region and a second, contiguous, persistent memory region, provides the computer with a persistent, volatile memory, said program comprising:
computer-readable program means for reading from the second, persistent memory region in response to requests coming from the operating system; and
computer-readable program means for writing to the second, persistent memory region in response to requests coming from the operating system.

23. The program of claim 22 wherein the second, persistent memory region of the computer comprises a look-aside buffer including a set of state bits and a buffer region for the storage of data, the program further comprising:
computer-readable program means for setting the state bits to a first value before writing the contents of a request to the buffer region;
computer-readable program means for writing the contents of a request to the buffer region;
computer-readable program means for setting the state bits to a second value after successful completion of the writing of the contents of a request to the buffer region;
computer-readable program means for copying the contents of the buffer region to the appropriate location in the second, persistent memory region; and
computer-readable program means for setting the state bits to a third value after successfully copying the contents of the buffer region to the appropriate location in the second, persistent memory region.

* * * * *